Patented Feb. 23, 1937

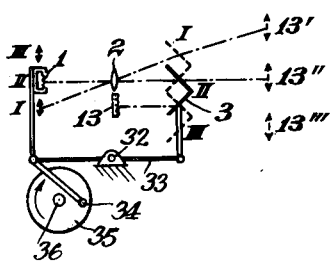
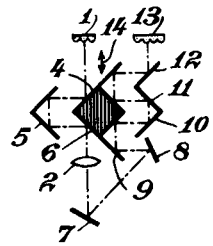
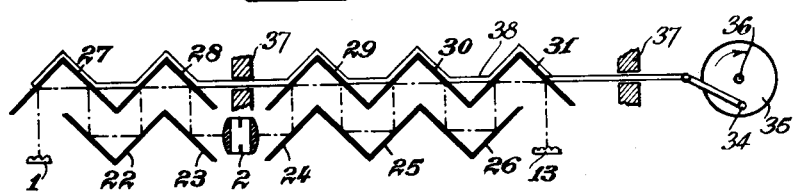
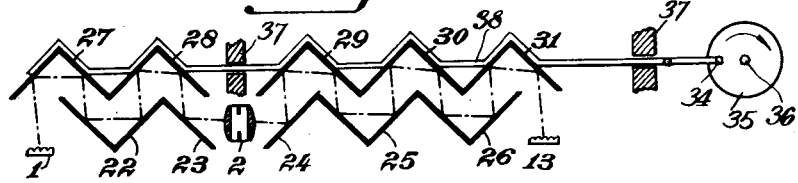
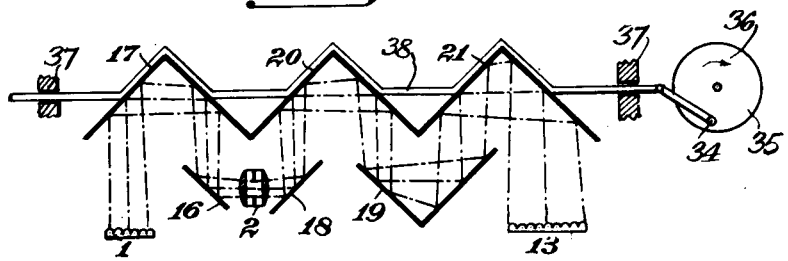
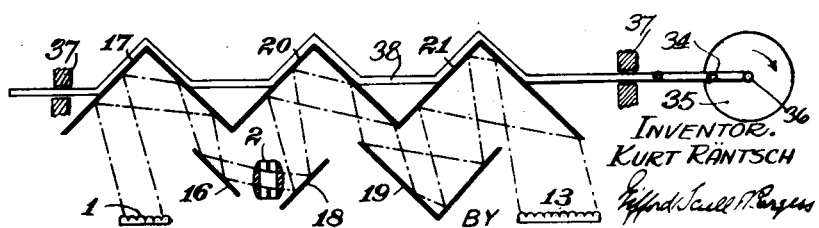

2,071,764

UNITED STATES PATENT OFFICE 2,071,764

APPARATUS FOR PRINTING LENTICULATED FILMS

Kurt Räntsch, Teltow-Seehof, near Berlin, Germany, assignor to Opticolor Aktiengesellschaft, Glarus, Switzerland, a Swiss corporation Application August 30, 1934, Serial No. 742,188
In Germany September 1, 1933

2 Claims. (Cl. 88—24)

This invention relates to an improvement in apparatus for printing lenticular films. Usually the original lenticular films are taken in a camera provided with a polychromatic filter, the copy films are projected in a projection apparatus which is provided with an equal or similar color filter.

In my co-pending application Ser. No. 688,545, filed September 8, 1933, I have described an optical printer for lenticular films including a copying lens and further optical means disposed in the path of light passing between the original and the copy film, said means causing the aperture of the copying lens to be seen from the lens elements of the films in a plurality of different directions. This arrangement allows to use a copying lens which has a smaller relative aperture than the lenticular elements of the films and therefore may have a good correction. To obtain the desired effect it is advantageous as described in my above mentioned application to produce a relative movement between the films and the optical means disposed between the original and the copy film.

It is frequently desirable in printing films to produce on the copy film pictures of another scale as on the original film. For instance, a standard 35 mm. film shall be printed on a 16 mm. amateur film. It is possible to use the optical printer described in my prior application in altering the scale of the pictures, if the moved optical means on the side of the original film and of the copy film oscillate with different amplitudes. In this case the oscillating optical means must be arranged on different separately driven supports. It is obvious that the optical printing process requires a great exactness with respect to the employed guiding means. There are more difficulties to move and to guide two supports than one support in all different positions with the necessary exactness.

It is an object of the invention, to make use (in an optical printer of the manner described above) of such a number of moved optical means, that the amplitude of oscillation of all the moved optical means is equal. According to the number of the moved optical means the pictures of the films may be enlarged and reduced in different proportions. However, the alteration of scale is only possible in a ratio of whole numbers. But this limitation is not an essential disadvantage, as it is always possible, to bring about each practically desired enlargement or reduction by a ratio of whole numbers. The most important case in the practice is the printing from standard 35 mm. film on 16 mm. amateur film. For this instance the ratio 2:1 or 1:2 may be chosen with good approximation.

Other objects and advantages of this invention will be more fully understood from the following description when read in connection with the accompanying drawing in which the same reference characters denote the same parts throughout and in which, Fig. 1 is a diagrammatic view of an optical printer according to the invention, the original film and an optical means on the side of the copy film being moved, the ratio of the scales being 1:2;

Fig. 2 shows an optical printer, both the films being in rest, one movable means being moved, the ratio of the scales being also 1:2;

Figs. 3 and 4 represent in different positions several moved optical means rigidly connected together, the ratio of the scales being also 1:2;

Figs. 5 and 6 show also in different positions several moved optical means rigidly connected together the ratio of the scales being 2:3.

In Fig. 1 the pictures on the original film 1 are printed by the copying lens 2 on the copy film 13. The pictures on the film 13 have double the size as those on the film 1. Between the copying lens 2 and the film 13 the optical square 3 is arranged, so that the film is seen at 13" from the copying lens. During the printing process the guiding means of the film 1 and the optical square 3 are set in motion in such a manner, that the positions designated by I, II and III are reached one after the other. As the copying lens 2 has double the distance from the film image 13" as from the film 1, the optical square 3 is arranged on half the way between the lens 2 and the film image 13". In this position the optical square 3 has the same amplitude of oscillation as the film 1.

The means for oscillating the various parts may comprise a crank pin 34 on a revolving crank disk 35 rotating about its axis 36. The pin is connected to a lever 33 which swings on a fixed pivot 32 and is connected by links at one end to the film gate enclosing the film 1 and at the opposite end to the optical square 3.

While Fig. 1 represents an arrangement with two different oscillating means which oscillate with the same amplitude, the optical printer according to Fig. 2 requires only one oscillating optical means. For this instance the pictures on the film 13 have also double the size as those on the film 1. To avoid confusion, such oscillating means is not shown in Fig. 2, since it may be the same kind as shown in Figs. 3, 4, 5, and 6. The light rays pass from the film 1 over the reflecting surface 4, the optical square 5, the plane mirror 6, through the copying lens 2, over the plane mirrors 7 and 8, the optical squares 9, 10 and 11 and finally over the plane mirror 12 to the film 13. The whole path of rays from the film 1 to the lens 2 has half the length as the path from the lens 2 to the film 13. The reflecting surfaces 4 and 6 are rigidly connected to the optical squares 9 and 11 and movably arranged towards the lens and the films, so that they may oscillate in the directions of the double arrow 14. Hereby the image of the aperture of the copying lens seen from the films moves to such an extent for both films, that the extreme rays from the copying lens to the films include the same angle. The original film and the copy film have lenticulations or lens elements of equal aperture, it being well known in the art that the standard aperture for lenticulated film is F:2.5. This standard is preferably used for both original and copy films. Beyond this the films are seen from the copying lens in exactly opposite directions, as it is necessary for good printing. Another device which is also adapted for enlargement and reductions in the ratio 1:2 is represented in two different positions of the moved optical means in the Figs. 3 and 4. Between the films 1 and 13 the objective 2 is mounted; on the one side the unmoved mirror 16 with the moved optical square 17 are arranged while on the other side the unmoved mirror 18 and optical square 19 and the moved optical squares 20 and 21 are provided. The optical squares 17, 20 and 21 are rigidly connected together, being exactly adjusted one to the other, and oscillate in such a manner that they reach on the one side the extreme position shown in Fig. 4. The rays represented in the figures pass from the point on the margin of the films to the points on the margin of the copying lens. These extreme rays include all the other rays of the beams of light which cause the reproduction of the pictures.

The Figs. 5 and 6 show an optical printer, the ratio of the scales of the original film 1 and the copying film 13 being 2:3. Between the films the unmoved copying lens 2, the unmoved mirrors and optical squares 22 to 26 and the jointly and synchronically oscillating optical squares 27 to 31 are arranged. Fig. 5 represents the mean position of the moved optical means, while in Fig. 6, a side position is shown. The lengths of the paths of rays on the side of the original film and on the side of the copy film are in the ratio of 2:3.

In Figs. 2, 3, 4, 5, and 6, oscillation may be caused by a device similar to that shown in Fig. 1 and including the same crank disk 35 which is employed to reciprocate a frame 36 supported in guides 37.

In all of the figures of the drawing, the light path between the original film and the copy film is shown by a dot and dash line, it being understood that any suitable source of light may be employed for thus transmitting light through the original film to the copy film and by aid of the optical elements shown, either by themselves or with the aid of additional elements known in the art.

It is advantageous to provide a split shaped diaphragm in the objective, the direction of the split being perpendicular to the direction of the oscillating movement. A further improvement of the quality of the pictures may be obtained by using a punctiform diaphragm opening.

The devices represented in the Figs. 2–6 have over the device shown in Fig. 1 the advantage, that the film guiding means are firmly arranged, whereby a greater exactness and a better quality of the pictures is obtained.

Having thus described my invention, what I claim as new and desire to secure by Letters Patent is:

1. In combination, an original lenticulated film and a copy lenticulated film, means forming an optical path for the passage of light from the original to the copy film, said means including a relatively fixed copying lens of smaller aperture than the lenticulations of said films and disposed in said path nearer one film than the other, and also including a plurality of reflecting surfaces disposed in said path between said lens and arranged in two sets, one set between the lens and copy film and the other between the lens and original film, and means for moving said sets transversely of said path, the amplitude of movement of one set being substantially equal to the amplitude of movement of the other set.

2. In combination, an original lenticulated film and a copy lenticulated film, means forming an optical path for the passage of light from the original to the copy film, said means including a relatively fixed copying lens of smaller aperture than the lenticulations of said films and disposed in said path nearer one film than the other, and also including a plurality of reflecting surfaces disposed in said path between said lens and arranged in two sets, one set between the lens and copy film and the other between the lens and original film, and means for moving said sets transversely of said path, the amplitude of movement of one set being substantially equal to the amplitude of movement of the other set and the number of reflecting surfaces in one set being greater than that in the other set.

KURT RÄNTSCH.